April 12, 1949. A. SIMMON 2,467,057
CATHODE-RAY TUBE DEVICE TO MEASURE DENSITY
DIFFERENCES OF PHOTOGRAPHIC TRANSPARENCIES
Filed Dec. 24, 1947 2 Sheets-Sheet 1

INVENTOR:
Alfred Simmon

BY Walter E. Wollheim
ATTORNEY.

April 12, 1949.　　　　　A. SIMMON　　　　2,467,057
CATHODE-RAY TUBE DEVICE TO MEASURE DENSITY
DIFFERENCES OF PHOTOGRAPHIC TRANSPARENCIES
Filed Dec. 24, 1947　　　　　　　　　　　　　2 Sheets-Sheet 2

INVENTOR:
Alfred Simmon

BY Walter E. Woelheim

ATTORNEY.

Patented Apr. 12, 1949

2,467,057

UNITED STATES PATENT OFFICE 2,467,057

CATHODE-RAY TUBE DEVICE TO MEASURE DENSITY DIFFERENCES OF PHOTOGRAPHIC TRANSPARENCIES

Alfred Simmon, Jackson Heights, N. Y., assignor to Simmon Brothers, Inc., Long Island City, N. Y., a corporation of New York Application December 24, 1947, Serial No. 793,666

5 Claims. (Cl. 88—14)

1

The object of this invention is a device for measuring density differences of photographic transparencies or negatives, and particularly the difference between the maximum and minimum density of a transparency which is commonly called contrast. By purposely including a small portion with zero density within the area to be measured, the device can also be easily adapted to indicate directly the maximum density of any photographic transparency.

A preferred embodiment of the invention is illustrated in the accompanying drawings in which Fig. 1 is a diagrammatic cross sectional view of the device which also indicates the circuit in a more or less schematic form;

Figure 1:
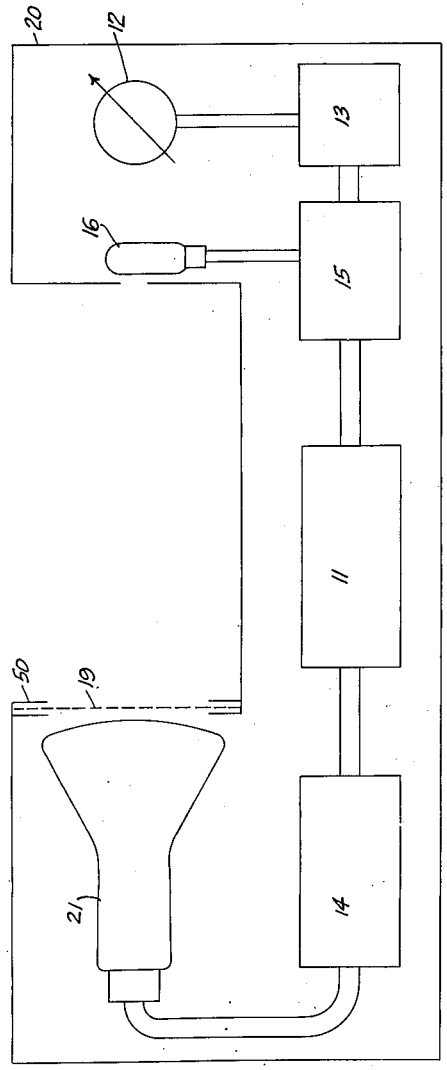

The device comprises a box-like structure 20, preferably made from sheet metal or the like and schematically shown in Fig. 1. Within this device is mounted a cathode ray tube 21, means to support a photographic transparency 19, including a film stage 50 and a photoelectric cell 16. The cathode ray tube 21 and the photoelectric cell 16 are, respectively, connected to supply circuits 14 and 15. Operatively connected to the supply circuit of the photoelectric cell are a measuring circuit 13 which terminates in a measuring instrument 12, and a modifying circuit 11. The measuring instrument is so mounted within the supporting structure that dial and pointer are visible from the outside and the output of the modifying circuit 11 is, in turn, imposed upon the control grid of the cathode ray tube 21, thereby modulating its light output in accordance with the density of the photographic negative at individual points. The modifying circuit is designed in such a way that the differences of photocell currents are made directly proportional to differences of photographic densities, and the measuring instrument thereby reads directly density differences.

In the interest of simplicity, voltage sources have in the following been represented by batteries, but it will be understood that in reality these batteries can be readily replaced in the conventional manner by transformers, rectifiers and condensers. Since the circuits used in this device are uniformly extremely sensitive to small voltage fluctuations, automatic voltage regulators or

2 stabilizers must be used in this case in order to render all voltages substantially independent of small changes of line voltages. In the interest of clarity, these stabilizers as well as supply circuits for the various filaments for cathode ray and rectifying tubes have been omitted. These filaments in reality are either fed from small batteries or filament transformers.

The cathode ray tube is of substantially conventional design such as, for example, used in oscilloscopes or television receivers. It comprises a glass vessel 22 which contains all other elements such as a filament 23, a cathode 24 heated thereby, a control grid 25, two focusing members 26 and 27 including a second control grid 27', two pairs of deflection plates 28 and 29, respectively, and a screen capable of light emittance 30.

The supply circuit operatively connected to this tube also does not depart from conventional design. It comprises substantially four parts, a filament circuit which is not shown, an acceleration and focusing circuit, a control grid circuit and the deflection circuits.

The acceleration and focusing circuit comprises a source of D. C., for example, a battery 32 which is connected to a potentiometer 33. The various points of this potentiometer are, respectively, connected to the cathode 24, the two focusing members 26 and 27 and the screen 30, each of these elements having a positive potential with respect to the preceding one.

The control grid 25 always has a negative bias with respect to the cathode 24 which is necessary since otherwise the electrons emitted by the cathode cannot be correctly focused to a point upon the screen. The negative bias consists of two voltages, the first voltage being delivered by the extreme left portion of the potentiometer 33 and the second voltage being delivered by the photoelectric cell 16 by means of the modifying circuit as will be described later. The two bias voltages are additive and the bias delivered by the extreme left end of potentiometer 33 represents the minimum that always will be impressed upon the control grid 25.

The two pairs of deflection plates 28 and 29 are, respectively, connected to two sweep circuits which comprise saw tooth wave generators 35 and 36. These saw tooth wave generators are of well known design and deflect the luminous point formed upon screen 30 with substantially constant velocities but with different frequencies and in different directions, or more precisely, in directions which are perpendicular to each other. The result of this arrangement is that the luminous spot formed upon screen 30, scans a predetermined area of that screen in a television like manner. Each of these two deflection circuits is biased, respectively, by means of a small battery 37 and 38 and potentiometer 39 and 40. By means of these additional bias circuits the starting points of the two sweep circuits can be properly adjusted. The width of the sweeps produced by these circuits can be controlled by adjusting the respective voltages and a potentiometer 41 connected to sweep circuit 36 has been shown in operative connection with the deflection plates 29. For a purpose which will be explained later, this potentiometer is equipped with two sliding contacts 42 and 43 and a single pole two step switch 45. By means of this switch the width of the sweep produced by 36 can be adjusted in two predetermined steps.

Figure 3:
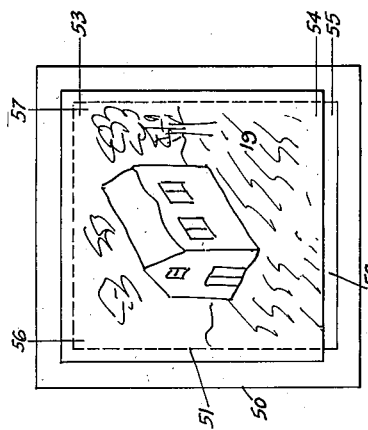
Fig. 3 shows an elevational view of the film stage.

A transparency support is arranged in front of cathode ray tube 21 which is shown in detail in Fig. 3. It comprises essentially a plate 50 with an aperture 51. This aperture is wider in one direction than the transparency 19. A gap 52 is thereby formed which, in effect, represents a small area with zero density. Referring back to switch 45 and the associated potentiometer 41, the distance between line 53 and line 54 represents the width of the sweep caused by circuit 36 in one position of the switch and the distance between lines 53 and 55 represents the sweep caused by said circuit in the other position of said switch. In one position the moving luminous point scans slightly less and in the other position it scans slightly more than the entire area of the negative. The width of the sweep caused by circuit 36 in the other direction remains unchanged between lines 56 and 57.

Figure 2:
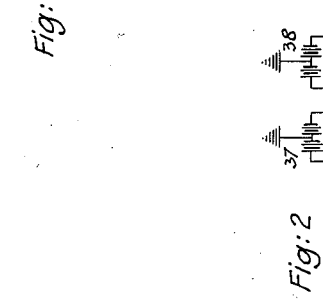
Fig. 2 is a more detailed diagram of this circuit.

The photoelectric cell 16 may be of any desired type known to the art, but in practice I prefer the so called photoelectric multiplier since additional amplifiers are usually not necessary with this type of tube. Referring to Fig. 2, a typical cell of this type comprises a glass vessel 60, a photo sensitive cathode 61 and nine additional electrodes 62. The cathode 61 and the nine electrodes 62 are connected to respective points of the potentiometer 63 upon which a voltage is impressed by a battery 64 or other source of voltage. The cathode 61 is connected to the most negative point at the extreme right of potentiometer 63 and the last electrode 62' is connected to the extreme left point of this potentiometer receiving the most positive potential. The wire connecting 62' to the left end of potentiometer 63 is interrupted and two resistors 65 and 66 are inserted in this circuit. During operation voltages depending upon the resistance values of 65 and 66 and upon the current circulating in the last loop of the photoelectric multiplier circuit are built up across these resistors.

The distance of photocell 16 from transparency 19 must be sufficiently large so that all points of said transparency have substantially the same distance from said cell.

The photocell circuit is operatively connected simultaneously to the measuring circuit and to the modifying circuit. The output voltage of the modifying circuit, in turn, biases the control grid 25 of the cathode ray tube 22.

It is the purpose of the measuring circuit to measure automatically the difference between the respective maximum and minimum values of the currents flowing between the left end of potentiometer 63 and electrode 62'. Instead of measuring currents, however, it is more convenient to measure the corresponding voltages which are built up across resistor 66. The upper end of resistor 66 assumes a negative, and the lower end assumes a positive potential. A battery 70 or other source of voltage is connected in series with resistor 66 in such a way that its polarity is opposed to that of resistor 66, i. e., the upper end is positive and the lower negative. The voltage of this battery is so chosen that it is smaller than the maximum voltage impressed upon resistance 66 and larger than the minimum voltage impressed thereupon. The voltage built up across 66 and the opposing voltage delivered by battery 70 are combined to form a source of voltage with two terminals 71 and 72'. One of these terminals, for example, 71, is connected to two rectifiers 72 and 73 which are arranged in opposite directions, i. e., the cathode of one and the anode of the other are connected together to point 71. Two condensers 74 and 75 are in series with these two rectifiers, respectively, each of these condensers having two binding posts. Voltage measuring instrument 76 is connected to the two binding posts by means of which said condensers are connected to the respective rectifiers. The two other binding posts of the condensers are connected to each other and to the second terminal of the source of voltage formed by elements 66 and 70, i. e., to point 72'.

The rectifiers 72 and 73 are shown to be vacuum tubes but any other type of rectifier, for example the copper oxide type, can also be used if so desired. The voltage measuring instrument 76 must be of a type which does not consume any current, i. e., it must be either of the electrostatic type or it must be of the various types of vacuum tube voltmeters. It can be seen that this circuit functions in such a way that whenever the voltage built up across 66 is larger than voltage of battery 70, the current passes rectifier 72, charging condenser 74. Whenever the voltage impressed upon resistor 66 is smaller than the voltage of the battery 70, the current will pass rectifier 73, charging condenser 75. The instrument 76, of course, will read the sum of the two condenser voltages.

If I call the voltage impressed upon resistance 66e, and the voltage of battery 70E, then the voltage impressed upon condenser 74 will be $$e_{max} - E$$

The voltage to which condenser 75 will be charged will be $$E - e_{min}$$

and the sum of the two voltages will, of course, be $$e_{max} - e_{min}$$

Figure 5:
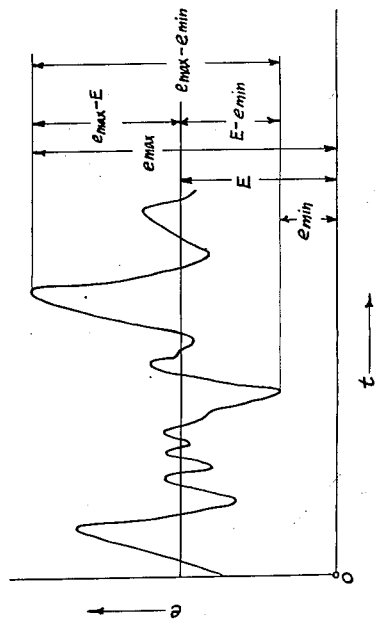
Fig. 5 is a typical oscillogram of the photocell output voltage and serves to explain the function of the measuring circuit connected to this device.

The situation is clarified in Fig. 5 which shows a schematic oscillogram of a typical photocell voltage together with a properly chosen voltage for battery 70.

The photocell output current or, more specifically, the voltage impressed upon resistance 65 is fed into a modifying circuit. The output voltage of this circuit is then impressed upon the grid of the cathode ray tube and used there to modulate the brightness of the luminous spot formed on the screen. It is, therefore, clear that the modifying circuit must deliver an output voltage which is a definite mathematical function of the input current or voltage. This mathematical function will be derived in the following paragraph:

The current passing the cathode ray tube can be expressed within certain limits by the formula $$I = I_{max} - ae \qquad (1)$$

I is the current passing the cathode ray tube at any given instance, and $I_{max}$ is the maximum permissible cathode ray tube current. This value may be determined either as the maximum current that the screen of the tube will withstand without deterioration, or it may be the maximum value for which the linear relationship between cathode ray tube current and grid bias still holds true, or it may be determined by any other convenient consideration. Both I and $I_{max}$ are conveniently expressed in micro amps ($\mu A$). $e$ is the additional negative voltage impressed upon the control grid 25 which is added to the voltage impressed upon this grid by the left end of potentiometer 33. In other words, the left end of potentiometer 33 imposes a certain constant minimum negative voltage upon the grid at all times and the voltage $e$ which is the output voltage of the modifying circuit will be added thereto. $e$ is expressed in volts. $a$ is a constant which depends upon the characteristics of the individual cathode ray tube and which has a dimension $$\frac{\mu A}{\text{volts}}$$

The light intensity on screen 30, i. e., before the light has passed the negative, is again within reasonable limits directly proportional to the cathode ray tube current or $$L_1 = bI \qquad (2)$$

$L_1$ is expressed in foot candles (or any corresponding metric dimension) and $b$ is a constant again depending upon the characteristic of the cathode ray tube, measured in $$\frac{\text{foot candles}}{\mu A}$$

The light intensity at the film stage level, i. e., after the light has passed the transparency, is expressed by $$L_2 = L_1 \cdot 10^{-D} \qquad (3)$$

where D is the density of the photographic transparency at the point which, at any given instance, is illuminated by the luminous spot of the cathode ray tube.

The light intensity in the plane of the photo sensitive cathode 61 of the photoelectric cell 16 is proportional to $L_2$ but, of course, considerably smaller, depending upon the distance between the two tubes.

$$L_3 = dL_2 \qquad (4)$$

$d$ is a dimensionless constant.

The photocell current is again within wide limits proportional to the light impinging upon the photoelectric cell or $$i = f \cdot L_3 \qquad (5)$$

where $f$ is a constant denoting the light sensitivity of the photoelectric cell, in $$\frac{\mu A}{\text{foot candles}}$$

I shall now impose the condition that the modifying circuit shall deliver $e$ as a function of $i$ (output voltage as a function of input current) in such a way that differences of photocell currents shall become directly proportional to density differences of the transparency to be measured, or $$i_1 - i_2 = h(D_2 - D_1) \qquad (6)$$

$h$ is a proportionality factor which has the dimension of a current and which is expressed in $\mu A$.

$D_1$ and $D_2$ are the photographic densities of two points of the transparency, and $i_1$ and $i_2$ are the corresponding photocell currents, i. e., the currents which are measured when the luminous spot of the cathode ray tube is placed, respectively, behind the two points with the two densities $D_1$ and $D_2$.

Equations 1, 2, 3, 4 and 5 can be combined and solved for D with the following result:

$$D = \log\left[\frac{bdf}{i}(I_{max} - ae)\right] \qquad (7)$$

For $D = D_1$ there is, of course, $i = i_1$ and $e = e_1$ and likewise for $D = D_2$ there is $i = i_2$ and $e = e_2$. By substituting these values, we arrive at the following expression for $D_2 - D_1$:

$$D_2 - D_1 = \log\left(\frac{I_{max} - ae_2}{i_2}\right) - \log\left(\frac{I_{max} - ae_1}{i_1}\right) \qquad (8)$$

$D_2 - D_1$ can also be computed from Equation 6:

$$D_2 - D_1 = \frac{i_1 - i_2}{h} \qquad (9)$$

In the two Equations 8 and 9, $e_2$ becomes zero, and $i_2$ becomes $i_{min}$ for $D_2 = \Delta_{max}$, where $\Delta_{max}$ is the highest density within the measuring range of the device. $\Delta_{max}$ usually need not exceed the value 2.5.

$$\Delta_{max} - D_1 = \log\left(\frac{I_{max}}{i_{min}}\right) - \log\left(\frac{I_{max} - ae_1}{i_1}\right) \qquad (8a)$$

$$\Delta_{max} - D_1 = \frac{i_1 - i_{min}}{h} \qquad (9a)$$

These two equations can be combined and solved for $e_1$ with the following result:

$$e_1 = \frac{I_{max}}{a}\left(1 - \frac{i_1 \cdot 10^{-\frac{i_1}{h}}}{i_{min} \cdot 10^{-\frac{i_{min}}{h}}}\right) \qquad (10)$$

This is the mathematical function according to which the modifying circuit has to work, i. e., when the spot of the cathode ray tube passes a point with the density $D_1$, a photocell current $i_1$ will be generated which, by the modifying circuit, will be changed into a voltage $e_1$ which is then impressed, in addition to a constant negative bias, upon the control grid of the cathode ray tube.

It is interesting to note that the proportionality factor $h$ cannot be chosen entirely freely since it is limited by the condition that $e_1$ must always be positive. Looking at Equation 10, this means that the second term in the bracket must always be smaller than unity, or if I call the second term for convenience, $u$, I have $$u = \frac{i_1}{i_{min}} \cdot \frac{10^{-\frac{i_1}{h}}}{10^{-\frac{i_{min}}{h}}} < 1$$

In logarithmic terms this means $$\log u = (\log i_1 - \log i_{min}) - \left(\frac{i_1}{h} - \frac{i_{min}}{h}\right) < 0$$

or $$\left(\frac{i_1}{h} - \frac{i_{min}}{h}\right) > \log i_1 - \log i_{min}$$

Figure 6:
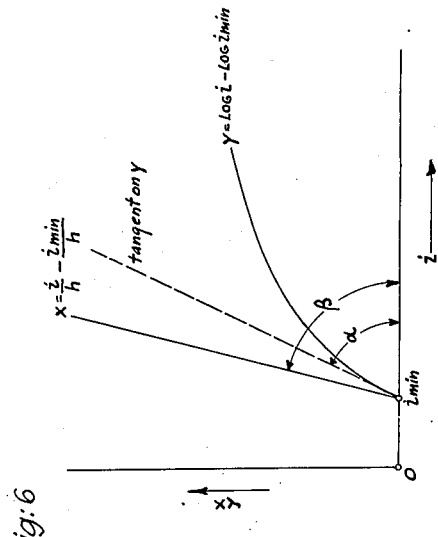
Fig. 6 explains a certain limitation of a mathematical constant of said modifying circuit.

The meaning of this relation becomes clear if I call for convenience the left term X and the right term Y, and present both graphically in a system of rectangular coordinates, see Fig. 6, as functions of $i_1$. In this presentation X is a straight line and Y is a curve, both passing the point $i = i_{min}$ on the $i$ axis. The angle formed by the straight line representing X, with the $i$ axis is $\beta$ and the angle formed by the tangent on the Y curve in the same point shall be $\alpha$. Obviously, if we want X always to be larger than Y, $\beta$ must always be larger than $\alpha$. The angle $\alpha$ can be computed in the customary way from the differential quotient $$\frac{dy}{di}$$

or $$\tang \alpha = \frac{m}{i_1}$$

where $m = .434$, the modulus of the Natural Logarithmic System. Likewise, $\beta$ can be expressed by $$\tang \beta = \frac{i}{h}$$

This gives us the desired relationship because if
$$\beta > \alpha$$
there must be $$\frac{1}{h} > \frac{m}{i_{min}}$$

or $$h < \frac{i_{min}}{m} \qquad (11)$$

The value $i_{min}$ which appears in Formulae 10 and 11 is the minimum current which will pass the photocell when the density of a point illuminated by the cathode ray tube spot becomes $\Delta_{max}$, which is the maximum density which the device shall be capable of measuring and which rarely, if ever, needs to exceed the value of 2.5. $i_{min}$ can be computed from Formulae 1 to 5 by substituting $\Delta_{max}$ for D and by making $e$ zero, i. e., $$i_{min} = bdfI_{max} \cdot 10^{-\Delta_{max}} \qquad (12)$$

The design of the modifying circuit itself is basically of no importance and any circuit which will modify an input current into an output voltage according to Formula 10 will be satisfactory. Circuits of this type are frequently networks using at least one non-linear resistance or impedance element such as one of the so-called semiconductors or a device using a saturated iron core or one of the various types of vacuum tubes. A preferred modifying circuit, however, which is in many respects superior to these networks, has been disclosed in my co-pending application Serial No. 791,439 and will be described as a preferred example in the following:

A modifying circuit built accordingly consists of three principal parts, a cathode ray tube 80, a stationary mask 110 and a photoelectric cell 120. It is emphasized that the cathode ray tube 80 and the photoelectric cell 120 are in no way identical with elements 21 and 16 which have been described above. They are entirely independent therefrom and perform entirely different functions.

The broad principle of the modifying circuit is that in some suitable manner a luminous line is formed on the screen of the second cathode ray tube 80, that the incoming signal, which in this case is the current passing the first photocell 16, is used to deflect this line in a direction at right angles to itself and that thereby, part of the light emitted by this line is cut off by the stationary mask which is placed in front of the luminous screen of tube 80. The light permitted to pass this mask is then made to impinge upon the second photoelectric cell 120 which forms part of the modifying circuit (not upon tube 16). The current passing this second photoelectric cell 120, or more precisely, the corresponding voltage impressed upon a resistor of suitable magnitude is then supplied as additional bias to the control grid 25 of the original cathode ray tube 22 which scans the transparency in the manner described.

This circuit is shown in detail as the right half of Fig. 2. The cathode ray tube 80 contains a filament 81, a cathode 82 heated thereby, a control grid 83, two focusing members 84 and 85 including a second control grid 85', two pairs of deflection plates 86 and 87 and a screen 88 capable of light emittance.

A luminous line can be formed upon this screen by any desired means, for example, by giving the focusing elements 84 and 85 a proper configuration. I prefer, however, to use a conventional cathode ray tube which forms a luminous spot upon the screen which is transformed into a line by means of a sweep circuit 90 which is operatively connected to the deflection plates 87. This sweep circuit is a saw tooth wave generator of the customary type which has a high frequency compared to the frequency of the signal impressed upon the other pair of deflection plates. It can be seen that the other set of deflection plates 86 is operatively connected to resistance element 65 upon which a voltage proportional to the current passing the first photocell 16, is impressed. Both sets of deflection plates 86 and 87 are biased by batteries 91 and 92 which are connected, respectively, to potentiometers 93 and 94. By means of this arrangement, the starting points of the two sweep circuits connected to deflection plates 86 and 87 can be adjusted.

The rest of the supply circuit for the second cathode ray tube is conventional. It consists of a battery 100 and a potentiometer 101, the various points of which are connected to the elements within the cathode ray tube in such a way that the control grid 83 assumes a fixed negative potential with respect to the cathode 82, but that 84 has a positive potential with respect to 82, 85 a positive potential with respect to 84, and 88 finally a positive potential with respect to 85.

Figure 4:
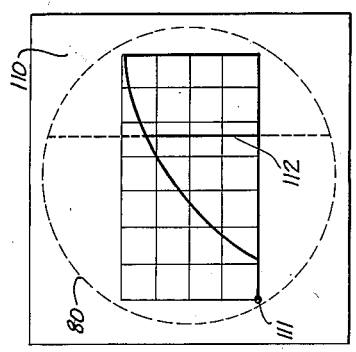
Fig. 4 is an elevational view of an apertured mask which forms part of a modifying circuit used in this device.

In front of screen 88, and preferably immediately adjacent thereto is a mask 110 which is again shown in Fig. 4. This mask has an aperture which directly represents the mathematical function expressed in Formula 10. The mask is a thin plate made of opaque material such as black paper and sheet metal, and its vertical width varies as a function of the horizontal distance from a point of reference 111 in accordance with Formula 10. For convenience, the lower borderline of this aperture is made a straight line, but this is not necessary and both the upper and lower borders may be curved as long as the vertical width of the aperture is the desired function of the horizontal distance from the point of reference 111. It can be seen that only that part of the light emitted by the luminous line 112 which is behind said aperture can pass and that the other parts which are shown in dotted lines above and below this portion are blocked off. The light impinging upon the second photoelectric cell 120 is, therefore, proportional to the length of that portion of line 112 which appears behind the aperture or is a direct function of the shape of said aperture, in other words, varies in accordance with Formula 10, provided the aperture is fabricated correctly.

The distance between photoelectric cell 120 and cathode ray tube 80 must, of course, be large enough so that all points of the luminous line have substantially the same distance from the photo sensitive cathode to the photoelectric cell 120. This cell may again be of any desired design and I have again shown a photoelectric multiplier tube because then a complicated amplifier can be avoided. The cell again has a photo sensitive cathode 121, and nine additional electrodes 122, the last one being called 122'. The supply circuit comprises a battery 124, and a potentiometer 123, the various points of which are in the usual manner connected, respectively, to elements 121 and 122. The wire between the extreme left point of potentiometer 123 and the last electrode 122' is again interrupted to receive a resistance element 125. The voltage impressed upon this resistance element by the current passing it represents directly the value $e_1$ used in Formula 10. $e_1$ is then by means of two wires 126 and 127 fed back into the grid control of the first cathode ray tube 21, i. e., voltage $e_1$ is added to the constant negative bias which control grid 25 has with respect to cathode 24.

If the luminous line upon the screen 88 of cathode ray tube 80 is formed in the preferred manner by a voltage of high frequency impressed by saw tooth wave generator 90 upon deflection plates 87, means must be provided to keep the output current or voltage of the photoelectric cell 120 from being modulated accordingly. This can be done simply by connecting a condenser 200, shown in dotted lines, of suitable magnitude across resistor 125, or a more complete filter formed in the usual manner of a network of capacitances and inductances can be connected in parallel with 125. A filter of this type has not been shown in detail since its design is well known and forms no part of this invention. If, however, the luminous line upon screen 88 is formed by other means, for example, by the proper configuration of the focusing elements 84 and 85, this filter means can be dispensed with.

The operation of the device can be easily understood from this description. A negative or other transparency 19 is placed in front of cathode ray tube 21 where it is scanned by the luminous spot on screen 30 by the co-action of the two circuits 35 and 36 which are, respectively, connected to deflection plates 28 and 29. I shall assume that at first the voltage of sweep circuit 36, as adjusted by potentiometer 41 and switch 45, is such that the vertical sweep, see Fig. 3, extends from line 53 to line 54, i. e., is slightly shorter than the width of the negative to be scanned.

Light passing the transparency 19 from the moving luminous spot impinges upon photoelectric cell 16 causing in a known manner currents to flow in the various wires connecting the point of potentiometer 63 to the various electrodes 61 and 62. This current is, of course, strongest in the wire which is connected to the last electrode 62'. Resistors 65 and 66 are placed into this circuit causing corresponding voltages to be built up there. The voltage built up across resistance 66 feeds the measuring circuit, and the other voltage built up across 65 feeds the modifying circuit which shall be contemplated first. In the modifying circuit a luminous line is formed upon screen 88 by the action of the saw tooth wave circuit 90 connected to deflection plates 87. This line in turn, is deflected at right angles to itself by the voltage built up across resistance 65 which is connected to the deflection plates 86. The position of the luminous line on screen 88 thereby depends, at any given instance, upon the current passing the first photoelectric cell 16, or upon the density of that point of negative 19 which at this instance is being scanned by the moving luminous point on the screen 30 of the first cathode ray tube 22. This line which is shown schematically as 112 in Fig. 4 is partly shielded by the mask 110, and only the light emitted by that portion behind the aperture in this mask is permitted to impinge upon the second photoelectric cell 120 placed at some distance in front of the mask 110. The condenser 200, or a more elaborate filter system used in its place, filters out the A. C. component of the photocell current which has been formed as a consequence of the luminous line upon screen 88 being formed by the movement of a luminous point by the saw tooth wave generator voltage which has been impressed upon the deflection plates 87. The current passing the second photoelectric cell 120 becomes thereby a function of the incoming signal, i. e., the current passing the first photo cell as modified by the mathematical function represented by a mask 110. A corresponding voltage is built up across resistance 125 which, in turn, is impressed as additional bias upon the control grid 25 of the first cathode ray tube 22. If the aperture in mask 110 has a shape substantially corresponding to the Formula 10 the circuit will fulfill the condition that differences of currents passing the first photocell 24 are directly proportional to density differences of the negative 19 to be scanned.

The measuring circuit which is actuated by the first photocell 24 causes voltages to be built up across condensers 74 and 75 which represent, respectively, $e_{max}-E$ and $E-e_{min}$, where $e_{max}$ and $e_{min}$ are maximum and minimum voltages built up across 66, respectively, and where E is the voltage of battery 70 which is in series with 66, but has the opposite polarity and which delivers a voltage smaller than $e_{max}$ and larger than $e_{min}$. The instrument 76, which must be of the type which consumes no current such as an electrostatic or vacuum tube volt meter, reads the sum of the voltages of condensers 75 and 74, or $e_{max}-e_{min}$. In other words, after the image on the transparency has been scanned a number of times the instrument 76 will directly indicate the maximum contrast of the negative. It will be noted that by using this particular electrical and optical circuit the meter divisions become uniformly spaced and not crowded together on one end as on other instruments used for the same purpose in the past.

The instrument can be easily adjusted to measure not the contrast which is $D_{max}-D_{min}$, but directly $D_{max}$ by the simple expedient of including a small portion in the scanned area which has zero density, i. e., by making $D_{min}=0$. This can be done by means of switch 45 which, when put in the other position, makes the voltage of sweep circuit 36 slightly larger so that, with reference to Fig. 3, an area between lines 53 and 55 is now being scanned. This area is slightly larger than the negative placed into the holder, thereby leaving a gap 52 open which, of course, represents an area of zero density. The minimum density can then be easily obtained from the two measured values by simple subtraction.

It will be clear that the broad principle expounded in these specifications can be widely modified. It has already been explained that the modifying circuit consisting of the second cathode ray tube 80 and the photoelectric cell 120 is merely a preferred embodiment and that other modifying circuits can be used equally well provided they deliver an output voltage as a function of an input current according to Formula 10. It may also be advisable to have light collecting elements placed between transparency 19 and photoelectric cell 24, and between mask 110 and photoelectric cell 120, respectively. It can easily be seen that these light collecting elements cannot be lenses, but they could, for example, be truncated pyramids with light reflecting inner surfaces, or truncated pyramids or cones made from glass or light transparent plastic material whereby the light is reflected from the outer boundaries by total reflection.

What I claim as new, is:

1. A device for measuring density differences of photographic transparencies, comprising a cathode ray tube including an electron emitting cathode, a control grid, two pairs of deflection plates, a light emitting screen and means to focus the electrons emitted by said cathode on a point of said screen, a supply circuit for said cathode ray tube including two sweep circuits respectively connected to said two pairs of deflection plates and adapted to deflect said point on said screen with substantially uniform velocities, but with different frequencies and in different directions, whereby the area of said screen is scanned in a television like manner, means to support a photographic transparency in front of said screen, a photoelectric cell placed in front of said transparency, a supply circuit for said cell, a measuring circuit operatively connected to said photoelectric cell including two condensers respectively adapted to be charged to voltages in accordance with the maximum and minimum current passing said cell, and a measuring instrument connected to said condensers and indicating a voltage in accordance with the difference of said currents, a modifying circuit, fed by said photocell current and delivering an output voltage substantially according to the formula $$e = A \left(1 - \frac{x.10^{-\frac{i}{B}}}{C}\right)$$

where $e$ is the output voltage of said circuit, $i$ the photocell current, and A, B and C are constants, and means to bias said control grid of the cathode ray tube in accordance with said output voltage, whereby the brightness of the luminous point on the screen is automatically modulated in accordance with the density of the point of the transparency illuminated by said point at any given instance, and whereby differences of intensities of the light impinging upon said photoelectric cell, and thereby differences of photocell currents, are rendered proportional to the respective density differences between corresponding points of the transparency, and whereby said measuring instrument reads directly the difference between maximum and minimum density of the area scanned by the luminous point on the cathode ray tube screen.

2. In a device according to claim 1, the measuring circuit comprising a resistor, adapted to be passed by said photocell current, a source of direct current in series with said resistor, but with the opposite polarity, and forming therewith a source of voltage with two terminals, the voltage of said source of direct current being smaller than the maximum voltage and larger than the minimum voltage built up by said photocell current across said resistor, two rectifiers, one with its cathode and the other with its anode connected to the first of said terminals, two condensers, one in series with one and the other in series with the other rectifier, a voltage measuring instrument connected to the two binding posts of said condensers which are respectively connected to said rectifiers, the two other binding posts of said condensers connected to each other and to said second terminals, whereby, during the scanning process, one condenser is charged to a voltage equal to the maximum photocell current multiplied by the value of said resistor minus the voltage of said source of direct current, and the other condenser is charged to the voltage of said source of direct current minus the minimum photocell current multiplied by value of said resistor, and whereby said measuring instrument reads the sum of the two condenser voltages which is proportional to the difference of maximum and minimum photocell current.

3. In a device according to claim 1, said modifying circuit comprising a second cathode ray tube, independent of the cathode ray tube named in claim 1, and with a screen capable of light emittance, a supply circuit for said second cathode ray tube, including means to excite a straight line on said screen to light emittance, means to deflect said line substantially at right angles to itself in accordance with the current passing the photocell named in claim 1, an apertured mask made from opaque material placed in front of the screen of said second cathode ray tube, the width of said aperture in a direction substantially parallel to said light emitting line varying according to the formula $$Y = D \left(1 - \frac{x10^{-\frac{X}{E}}}{F}\right)$$

Where Y is the width of said aperture, X the distance from a point of reference, in a direction at right angles to said light emitting line, and D, E and F are constants, a second photoelectric cell, independent of the cell named in claim 1, placed in front of said mask and connected to a supply circuit, and a resistor adapted to be passed by the current passing said second photocell, the voltage thereby impressed upon said resistor being used to bias the control grid of the first cathode ray tube named in claim 1.

4. In a device according to claim 1, said support for a transparency comprising a plate with an aperture which in one direction is wider than said transparency, whereby the area scanned by the luminous spot of the cathode ray tube is made to comprise a portion with zero density, and whereby said measuring instrument then reads directly maximum density values.

5. In a device, according to claim 1, said support for a transparency comprising a plate with an aperture which in one direction is wider than said transparency, and one of said sweep circuits including means to adjust its voltage in two steps, the first step causing the luminous spot of said cathode ray tube to move entirely within the area covered by said transparency, and the second step causing said spot to pass beyond the area covered by said transparency in the direction in which said aperture is wider than said transparency, thereby passing a region of zero density, whereby said instrument then indicates, respectively, contrast values equal to differences between maximum and minimum density values, and maximum density values.

ALFRED SIMMON.

No references cited.